F. W. MARTIN.
FLEXIBLE PIPE COUPLING.
APPLICATION FILED NOV. 5, 1919.

1,406,671.

Patented Feb. 14, 1922.
3 SHEETS—SHEET 1.

WITNESS:
Gustav Henzlinger.

INVENTOR
Frederick W. Martin
BY
Synnestvedt & Lechner
ATTORNEYS

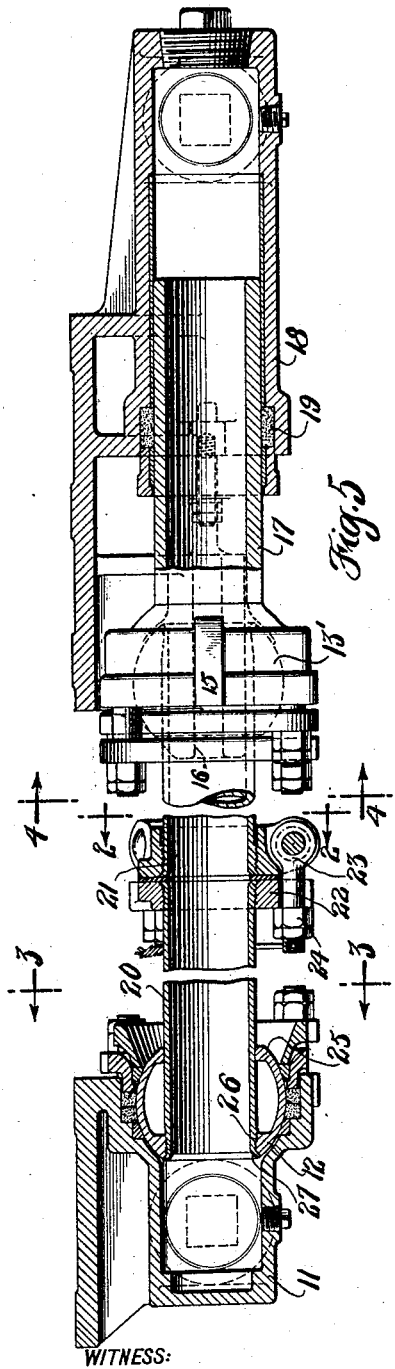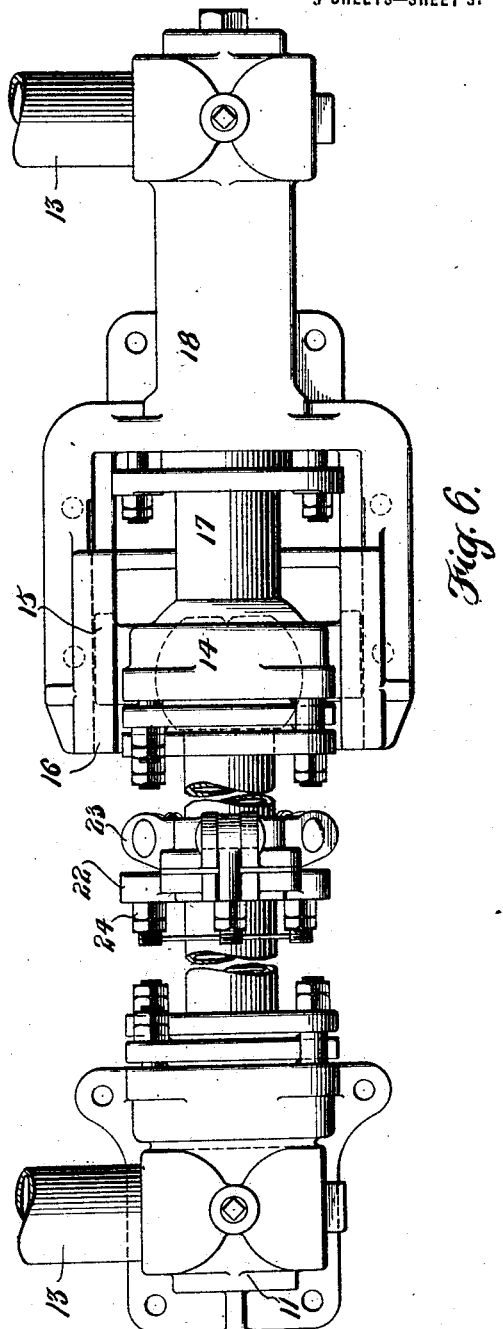

UNITED STATES PATENT OFFICE.

FREDERICK W. MARTIN, OF MANHATTAN BEACH, NEW YORK, ASSIGNOR TO FRANKLIN RAILWAY SUPPLY COMPANY, A CORPORATION OF DELAWARE.

FLEXIBLE PIPE COUPLING.

1,406,671.  Specification of Letters Patent.  Patented Feb. 14, 1922.

Application filed November 5, 1919. Serial No. 335,842.

*To all whom it may concern:*

Be it known that I, FREDERICK W. MARTIN, a citizen of the United States, residing at Manhattan Beach, in the county of Kings and State of New York, have invented certain new and useful Improvements in Flexible Pipe Couplings, of which the following is a specification.

This invention relates generally to flexible pipe couplings, but more particularly to such joints or couplings as are used for connecting the pipe sections on the engine and tender of a locomotive or between other vehicles in a train. Connections of this character are employed, for example, in conducting water, steam or other fluid from one of the vehicles of the train to another, and it is necessary that they be provided with a sufficient degree of flexibility to provide for a ready relative movement between the said vehicles without leakage at the joints of said flexible connections, and without interference with other parts of the mechanism.

One of the objects of this present invention is the provision of a joint of the character specified which will be strong and simple in construction and durable and efficient in its operation and in which a maximum amount of available rail clearance will be obtained when the device is applied on a locomotive or train.

Another object of this present invention is the provision of a joint of the character specified in which the tendency heretofore noticed in devices of this character for the balls to work loose from the tubes or pipes on which they are secured will be obviated, and the tendency to uneven wear reduced by the placing of the pipes and balls and parts in direct line instead of an offset line as in most of the structures heretofore used.

The above as well as such other objects as may hereinafter appear, I obtain by means of a construction which I have illustrated in preferred form in the accompanying drawings, wherein I have shown in—

Figure 1:
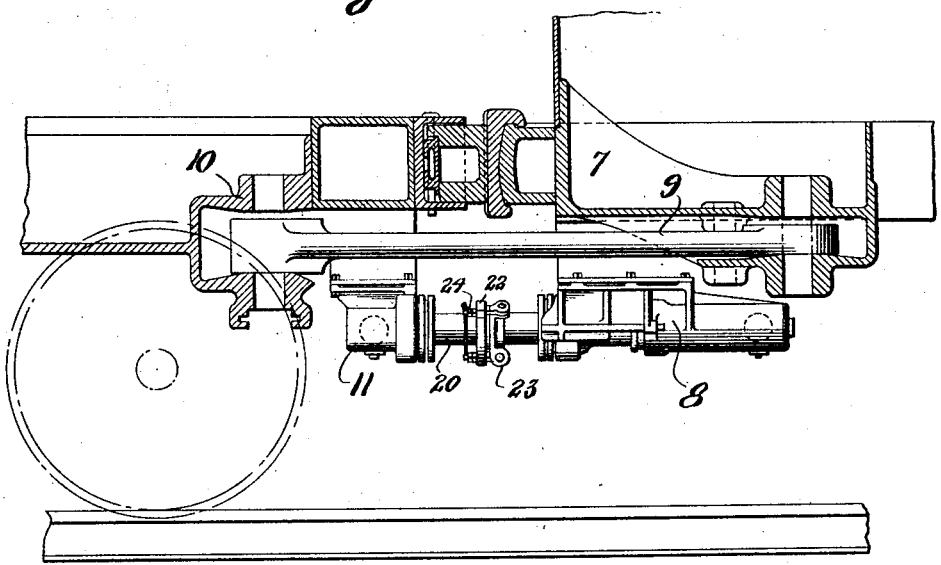
Figure 2:
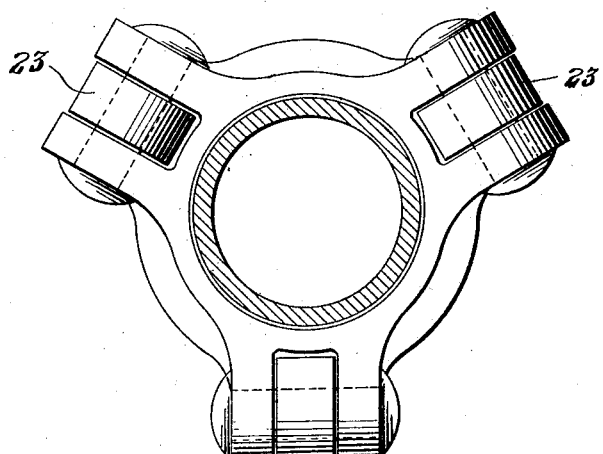
Figure 3:
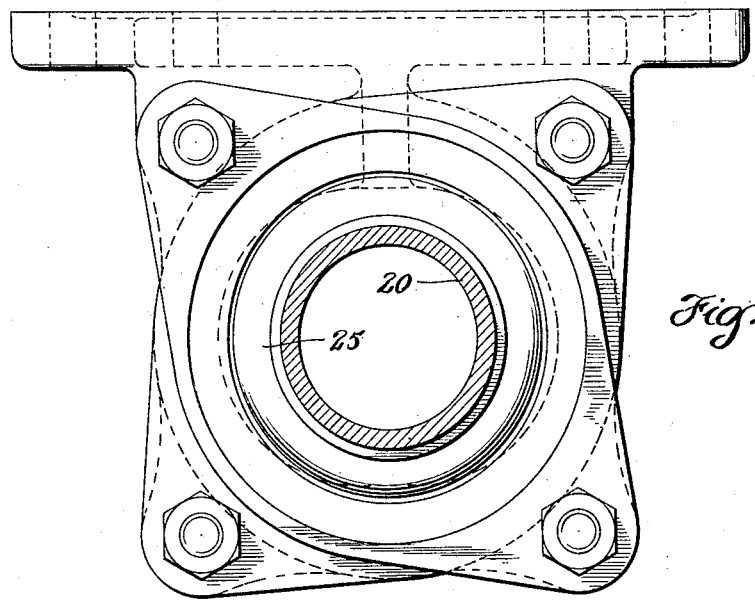
Figure 4:
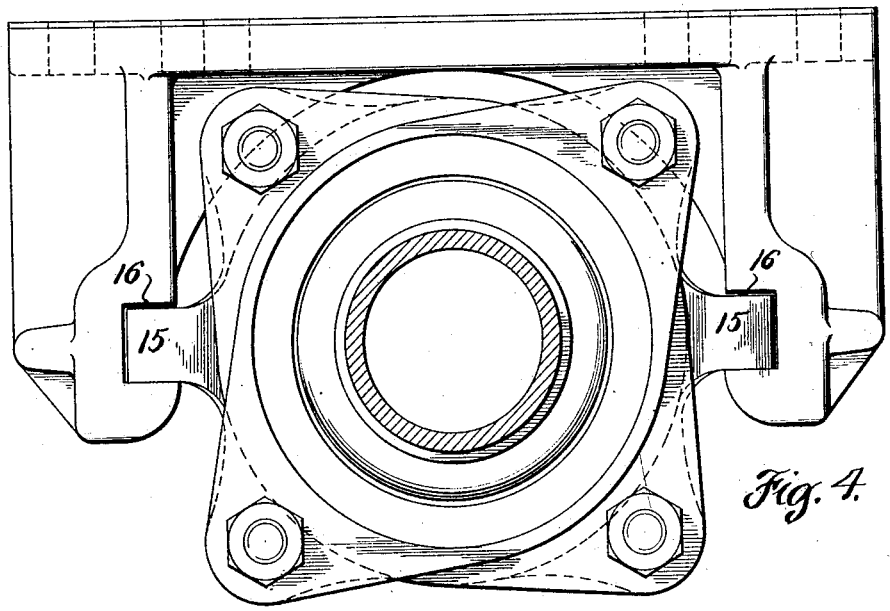

Figure 1 a longitudinal sectional view through the end parts forming a connection between a locomotive and its tender with my apparatus applied thereto. Fig. 2 is a transverse sectional view taken on the line 2—2 of Figure 5. Figure 3 is a transverse sectional view taken on the line 3—3 of Figure 5. Figure 4 is a sectional view on the line 4—4 of Figure 5. Figure 5 is a longitudinal sectional view, a portion of it being shown in side elevation indicating the detail of my joint arrangement more specifically, and Figure 6 is a plan view of the apparatus shown in Figure 5.

Referring now more particularly to Figures 1, 5 and 6, it will be seen that I have therein indicated a casting 7 which is located at the rear of the locomotive and forms a means for supporting the casting 8 that contains the slide joint of my pipe connection, and also forms a means for attaching the link connection 9, the other end of which is secured to the tender in a casting 10. Through the casting 10 on its under face I secure a socket member 11 which contains a ball joint 12, and is provided at one side with a lateral outlet 13 forming a connection to the fluid pressure conduit in connection with which the flexible joint device is to be used.

Another ball joint 13' is arranged within a sliding head casting 14, the laterally projecting ears 15 of which are carried in grooves 16 shown more in detail in Figure 4, and the tubular extension 17 of which enters the cylindrical member 18 and is packed as indicated at 19 by a suitable packing device forming a fluid pressure tight joint through which the member 17 can slide or telescope in and out as the movement between the locomotive and tender requires.

The connection between the balls 12 and 13' is formed by means of a tube constructed in two parts 20 and 21 joined together by the castings 22 and 23 and the bolts 24.

The tub 20 is secured to the ball at its end by passing it through a reamed and tightly fitting opening 25 and threading it at 26, the end being reamed over as at 27 in order to prevent any tendency of the motion of the parts to cause the ball to unscrew from the tube 20. This arrangement of connection between the ball and tube forms a very secure light weight and efficient device at a point which has been subject to considerable trouble in previous devices.

The arrangement of the supporting ear 15 carried within the groove 16 so as to take the weight of the casting 14 which houses the ball 13' not only provides a more secure support for the main body of this slide joint, but also removes any lateral or undue strain upon the slide bearing and packing 19 so there is a very much reduced wear of the joint at this point.

The arrangement of the mechanism on a direct center line as closely adjacent to the floor of the locomotive and tender as it can be placed without any depending or vertical branch pipe connection increases to a maximum the clearance available between the under side of the joint members and the rail, and also brings the parts into a straight line position which will avoid off set strains or uneven wear upon the members.

While I have shown the pipe connecting parts 13 as leading off laterally from the castings with which they are associated, it is obvious that if the space permits, the pipe connecting ends 13 may be secured directly in the ends of the castings if preferred.

I claim:

1. A flexible joint connection comprising in combination, a tubular connecting member, a flexible bearing at each end of said tubular member, and a socket casting at each end of said tubular member, one of said socket castings carrying a projection which is telescopically movable with relation to its housing and serves as supporting means for the main or body portion, and a support casting with which said support means has longitudinally movable relation.

2. A flexible joint connection having in combination a tubular connecting member, a ball joint at each end of said connecting member, a body casting or head housing one of said ball joints, a sliding extension on said head, packing means for the sliding extension, a cylindrical chamber for receiving the sliding extension, a guide support for the head serving to relieve said sliding extension of lateral strain, said several members being arranged in straight line connection, and without offset.

3. A flexible connection for a locomotive and tender having a tubular member provided with a ball joint on the locomotive and carried in a sliding head, the latter having telescopic relation with a support casting, the support casting being secured to the locomotive deck casting and provided with means for slidably supporting the head and means for packing the telescopic joint.

4. A coupling device for locomotives and tenders comprising in combination a ball joint on the tender and a ball joint on the locomotive, a member connecting said joints, a movable head housing one of the joints, means for slidably supporting the movable head, a tubular extension communicating with the joint having the movable housing and extending beyond the joint, a conduit communicating with the extension and having sliding movement with respect thereto, and means for slidably supporting and guiding the movable head serving to relieve said sliding extension of lateral strain, all of said members being arranged in straight line connection without offset.

5. A coupling of the character described comprising a hollow connecting member, a flexible joint at each end thereof, an extension on one of said joints, a conduit communicating with the extension, the extension and the conduit having relative sliding movement, and means for slidably supporting and guiding the flexible joint serving to relieve the extension of lateral strain, all of said members being arranged in straight line position without offset.

In testimony whereof, I have hereunto signed my name.

FREDERICK W. MARTIN.